United States Patent
Tsirkin

(10) Patent No.: US 9,607,165 B2
(45) Date of Patent: Mar. 28, 2017

(54) WATCHDOG CODE FOR VIRTUAL MACHINE FUNCTIONS

(71) Applicant: Red Hat Israel, Ltd., Ra'anana (IL)

(72) Inventor: Michael Tsirkin, Ra'anana (IL)

(73) Assignee: Red Hat Israel, Ltd., Ra'Anana (IL)

( * ) Notice: Subject to any disclaimer, the term of this patent is extended or adjusted under 35 U.S.C. 154(b) by 64 days.

(21) Appl. No.: 14/622,194

(22) Filed: Feb. 13, 2015

(65) Prior Publication Data

US 2016/0239324 A1 Aug. 18, 2016

(51) Int. Cl.
*G06F 9/44* (2006.01)
*G06F 21/62* (2013.01)
*G06F 21/54* (2013.01)
*G06F 9/455* (2006.01)

(52) U.S. Cl.
CPC ............... *G06F 21/62* (2013.01); *G06F 8/30* (2013.01); *G06F 21/54* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 5,948,097 A * | 9/1999 | Glew | ................. | G06F 9/4426 711/E12.097 |
| 6,349,355 B1 * | 2/2002 | Draves | .................. | G06F 9/4843 711/203 |
| 8,656,482 B1 | 2/2014 | Tosa et al. | | |
| 9,317,452 B1 * | 4/2016 | Forschmiedt | ....... | G06F 12/1458 |
| 2004/0122834 A1 * | 6/2004 | Durrant | .................. | G06F 9/4425 |
| 2008/0005560 A1 * | 1/2008 | Duffus | .................. | G06F 21/629 713/164 |
| 2013/0276057 A1 | 10/2013 | Smith et al. | | |
| 2014/0013326 A1 | 1/2014 | Neiger et al. | | |
| 2014/0068138 A1 * | 3/2014 | Patel | .................... | G06F 12/109 711/6 |
| 2014/0137180 A1 | 5/2014 | Lukacs et al. | | |
| 2014/0189194 A1 | 7/2014 | Sahita et al. | | |
| 2014/0189690 A1 | 7/2014 | Ramakrishnan | | |

OTHER PUBLICATIONS

Jun Nakajima, Reviewing Unused and New Features for Interrupt/APIC Virtualization, Published in Intel® 64 and IA-32 Architectures Software Developer's Manual, May 2012, 10 pages.
Jun Nakajima, James Tsai, Mesut Ergin, Yang Zhang, Wei Wang, Extending KVM Models Toward High-Perforamnce NFV, Copyright © 2014 Intel Corporation, 28 pages.
Mihai Dontu, Ravi Sahita, Zero-Footprint Guest Memory Introspection from Xen, Xen Project Developer Summit Aug. 18, 2014, 39 pages.
David Durham, Mitigating Exploits, Rootkits and Advanced Persistent Threats, Copyright © 2013-2014 Intel Corporation, Hot Chips 2014 Tutorial, 39 pages.

* cited by examiner

*Primary Examiner* — Meng An
*Assistant Examiner* — Jorge A Chu Joy-Davila
(74) *Attorney, Agent, or Firm* — Haynes and Boone, LLP

(57) ABSTRACT

Methods, systems, and computer program products for initializing a page with watchdog code, by: positioning a first set of instructions in a first address range on the page; determining that there is a second address range that is unused by the first set of instructions; and initializing the second address range with a second set of instructions, the second set of instructions being watchdog instructions.

20 Claims, 6 Drawing Sheets

WATCHDOG CODE FOR VIRTUAL MACHINE FUNCTIONS

BACKGROUND

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

BRIEF SUMMARY

According to an example, a method for initializing privileged memory pages in a virtual environment includes writing a first set of trusted instructions to a first page, the first set of trusted instructions positioned between a first offset and a second offset. The method further includes writing a first set of watchdog instructions to the first page, the first set of watchdog instructions positioned between a third offset and a fourth offset. The method further includes writing a second set of trusted instructions to a second page, the second set of trusted instructions positioned between the third offset and the fourth offset. The method further includes writing a second set of watchdog instructions to the second page, the second set of watchdog instructions positioned between the first page offset and the second page offset.

According to an example, a non-transitory computer-readable medium for executing instructions in a privileged environment comprising computer-readable instructions which, when executed by a processor, cause the processor to perform operations including writing trusted code in a first address range on a privileged page. The medium further includes instructions executed by a processor for determining that there is a second address range that is unused by the trusted code, the second address range located both: (i) prior to the first address range and (ii) adjacent to the first address range. The medium further includes instructions executed by a processor for initializing the second address range with watchdog code, the watchdog code including an instruction that prevents execution of other instructions on the privileged page. The medium further includes instructions executed by a processor for exposing the privileged page to a guest.

According to an example, a system for providing a virtual machine guest access to a privileged virtual machine function includes a processor in communication with a memory. The system further includes a first set of instructions stored before an offset on a first page, the first set of instructions not including a watchdog code. The system further includes a second set of instructions stored at the offset on the first page, the second set of instructions initialized with the watchdog code. The system further includes a third set of instructions stored before the offset on a second page, the third set of instructions initialized with the watchdog code. The system further includes a fourth set of instructions stored at the offset on the second page, the fourth set of instructions not including the watchdog code. The system further includes a page table identifying the second page as following after the first page in order of execution.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
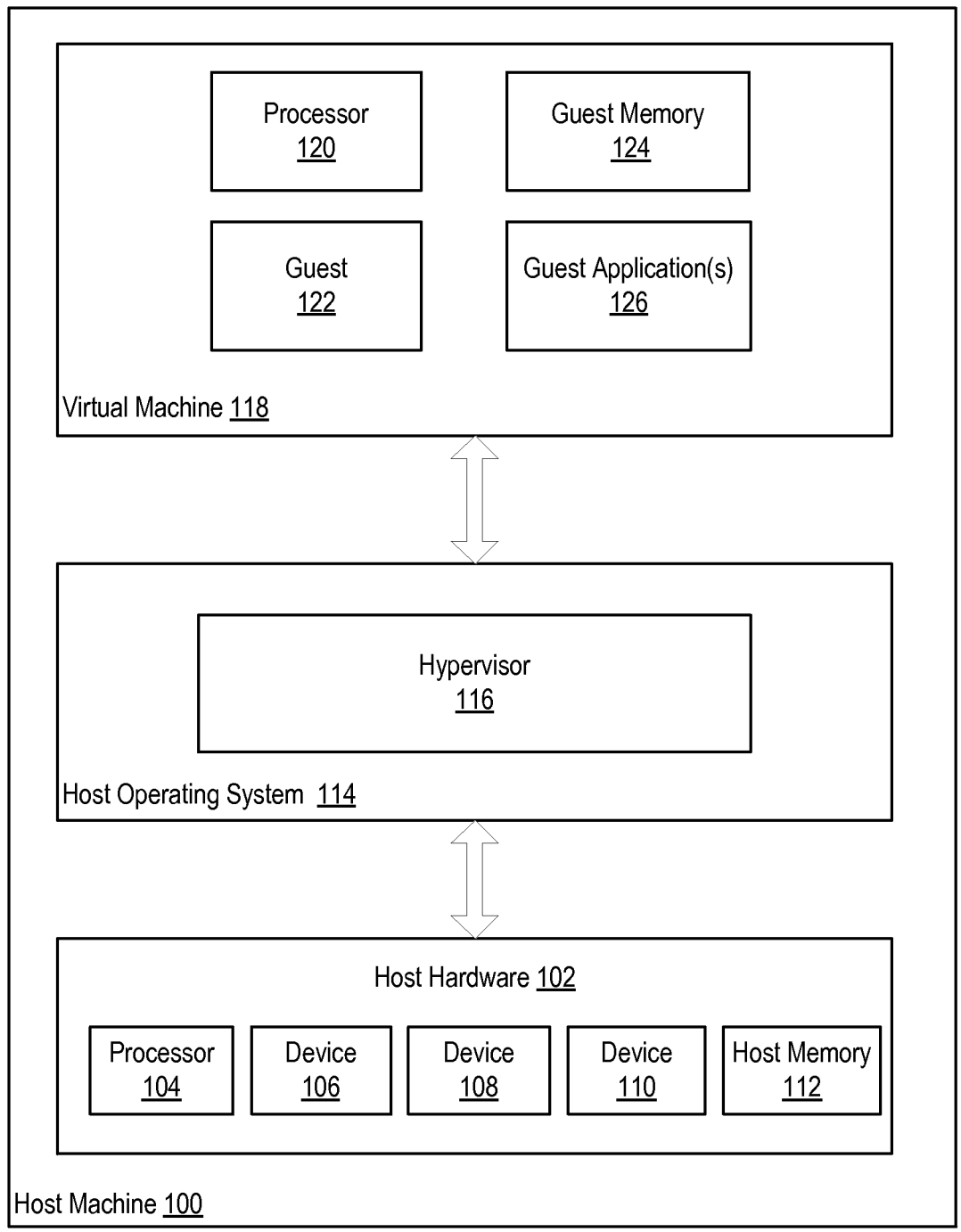
FIG. 1 is a block diagram illustrating an example of a computer system hosting a virtual machine, in accordance with various examples of the present disclosure.

FIG. 1 is a block diagram that illustrates an example of physical computer system that hosts one or more virtual machines. The physical computer system is referred to herein as a host machine 100.

Host machine 100 includes host hardware 102, which includes a processor 104, devices 106, 108 and 110, host memory 112, and other hardware components. Host machine 100 may include a single machine or multiple host machines arranged in a cluster.

The term "processor" may refer to one processor or multiple processors arranged in a cluster. Each processor may be a processor core of a microprocessor, a central processing unit (CPU), and so forth. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Each of the devices 106, 108 and 110 may be a physical device that is internal or external to host machine 100. Some examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, and so forth. Some examples of external devices include a keyboard, mouse, speaker, external hard drive, external I/O devices, and so forth. Devices 106, 108 and 110 communicate with software executed in the host memory 112. For example, the devices send data by generating device interrupts. Data is sent to the devices by writing data to ranges of addresses in the host memory 112 that are assigned to the devices.

Host memory 112 may include volatile memory devices (e.g., random access memory (RAM)), non-volatile memory devices (e.g., flash memory), and/or other types of memory devices.

Host machine 100 includes a host operating system 114 that is used to install and execute software programs. Host machine 100 includes a hypervisor 116 (also known as a virtual machine monitor (VMM)). In the present example, hypervisor 116 is a component of a host operating system 114. In other examples, hypervisor 116 may run on top of a host operating system 114, or may run directly on host hardware 102 without the use of a host operating system 114.

Hypervisor 116 manages system resources, including access of virtual machines to processor 104, devices 106, 108, 110, host memory 112, and so forth. Hypervisor 116, though usually implemented in software, may emulate and export a bare machine interface (host hardware 102) to higher-level software. Such higher-level software may comprise a standard or real-time operating system that may be a highly stripped down operating environment with limited operating system functionality and may not include traditional operating system facilities.

In the present example, the hypervisor provides a virtual machine 118, which is an underlying emulation of host machine 100. Virtual machine 118 can be, for example, a hardware emulation, full virtualization, para-virtualization, and operating system-level virtualization virtual machine.

The term virtual machine generally refers to part of a host system that is visible to a guest (e.g., guest 122). A virtual machine may include, for example, virtual CPUs (e.g., processor 120), one or more virtual devices such as an emulated NIC or disk, physical devices over which a guest is given partial or full control, virtual firmware such as a Basic Input/Output System (BIOS) and/or an Extensible Firmware Interface (EFI), an Advanced Configuration and Power Interface (ACPI), virtual memory (e.g., guest memory 124), and so forth.

In the present example, a guest 122 manages resources of the virtual machine 118. The term "guest" refers to the computer readable instructions run on a hypervisor 116 that is installed on a disk, loaded into memory, or currently running. A guest 122 may include, for example, a copy of firmware in memory, an operating system, additional installed software, a browser, applications running in a browser, and so forth. In one example, a virtual machine 118 running on a host machine 100 may run the same or a different guest operating system as the host operating system 114. Some examples of types of operating systems that may be run include LINUX, UNIX, OS X, WINDOWS, and so forth.

Guest memory 124 is memory allocated to and available for use by a guest 122. In an example, guest memory 124 may be memory presented to guest 122 by hypervisor 116. In one example, guest memory 124 is mapped to corresponding memory from a host machine 100 (e.g., host memory 112). For example, a unit of guest memory 134 may be mapped to and provided using a corresponding unit of host memory 112. A unit of memory generally refers to any subset, portion, piece, range, or region of memory (e.g., guest memory 134, host memory 112). Such "areas of memory" or "memory areas" may be referred to, as pages, blocks, extents, or any other type of measurable unit(s).

In the present example, host memory 112 includes a plurality of pages that are each assigned a host physical address (HPA). The hypervisor 116 maps the HPA to a guest physical address (GPA) of the guest memory 124. The guest 122 maps the GPA to a guest virtual address (GVA). The HPAs, GPAs and GVAs for pages may be stored in mapping data structures that order the pages relative to other pages. For example, a mapping table for virtual pages may order a first virtual page with a first GVA immediately prior, in order of execution, to a second virtual page with a second GVA.

One or more guest application(s) 126 run on guest 122. In an example, a guest application 126 may be a process or other type of software application that is executed. In one example, a guest application 126 also may refer to a process or application that runs on the guest operating system.

In the present example, the hypervisor 116 may configure the virtual machine 118 to allow the guest 122 to trigger a privileged mode of operation. As is illustrated with respect to the following figures, the hypervisor 116 initializes unused addresses of the privileged pages with watchdog code.

Figure 2:
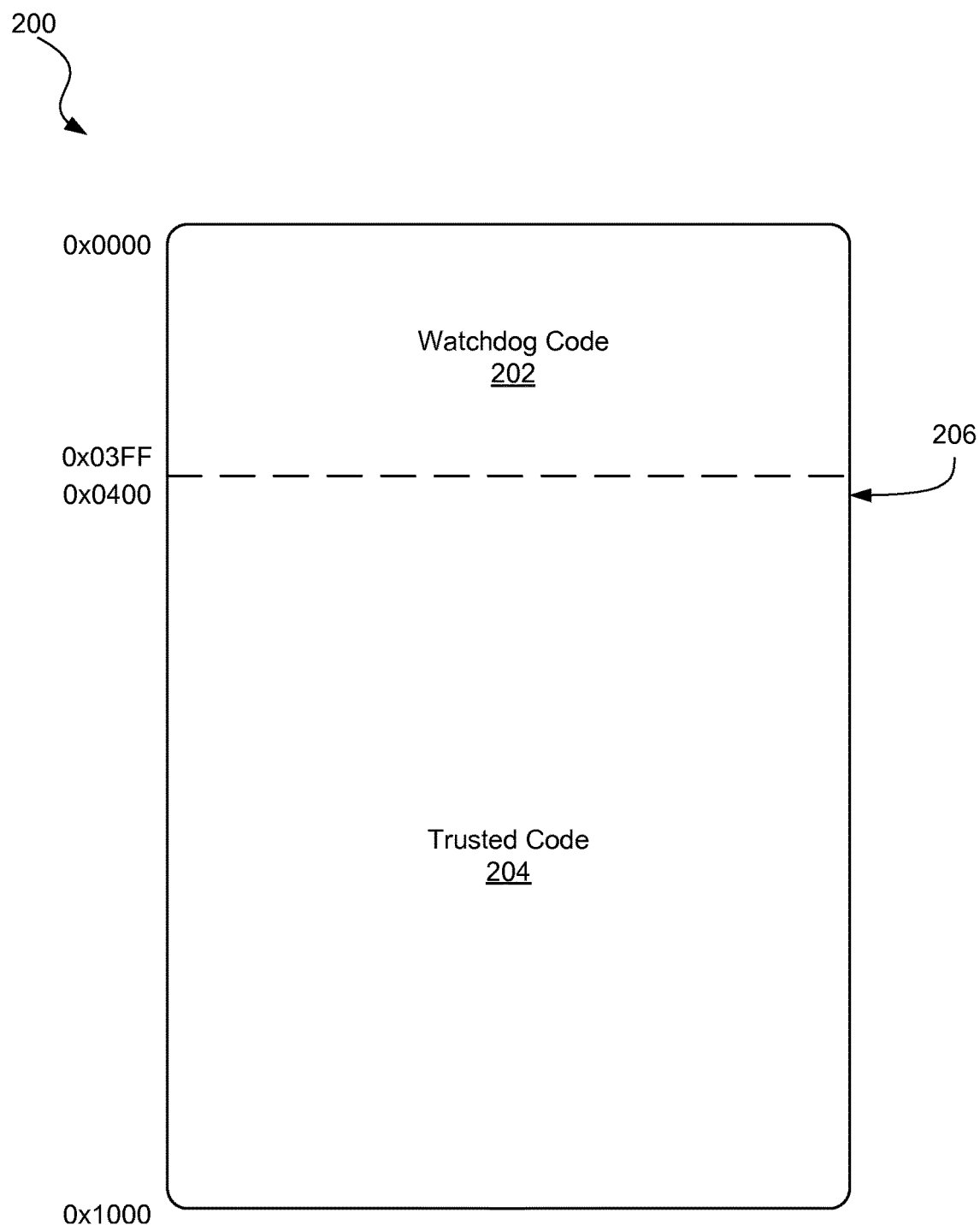
FIG. 2 is a block diagram illustrating a page initialized with watchdog code, in accordance with various examples of the present disclosure.

FIG. 2 is a block diagram illustrating a page initialized with watchdog code. According to the present example, a page in memory includes a watchdog code portion 202 and a trusted code portion 204.

In the present example, the page 200 may be referred to as a "privileged page." A privileged page may be a page that the hypervisor provides to a guest, in a secured environment, such that the guest may execute trusted code. Trusted code may be referred to as providing a "privileged function" or a "virtual machine function." Following execution of the trusted code, the guest may be switched from the privileged mode of operation to unprivileged mode of operation in which the guest does not have privileges to execute trusted code and returned from the page 200 to another code page.

For example, INTEL processors include a VMFUNC instruction. In some examples, the virtual machine is configured so that executing a "VMFUNC(1)" virtual machine function call instruction causes (1) guest access to untrusted guest code to be disabled, and (2) guest access to trusted code to be enabled. Additionally, by executing the "VMFUNC(1)" instruction, the guest may be granted access to privileged hypervisor memory. Upon completion of execution of the trusted code, the virtual machine is configured so that executing a "VMFUNC(0)" virtual machine function return instruction in the trusted code causes (1) guest access to trusted code and hypervisor memory to be disabled, and (2) guest access to untrusted code to be enabled.

Accordingly, the gaining of access privileges is ephemeral and is granted for the execution of the trusted code, with "normal" access privileges being restored to the guest following the execution of the trusted code.

In the present example, the page 200 is 4 KB (4096 bytes). Other examples may use larger or smaller page sizes. Page offsets measure the distance of instructions relative to the start of the page. The first instruction of the page is located at offset 0x0000. The last instruction of the page extends to offset 0x1000, which is 0x1000 bytes (4096 bytes when converted to decimal) from the start of the page. For example, page offset 0x0400 is 0x0400 bytes (1024 bytes when converted to decimal) from the start of the page.

Watchdog code 202 includes instructions that protect the page 200 from a guest attempting to execute instructions on the page 200 other than the trusted code 204 instructions or executing the trusted code 204 instructions in any unexpected order other than from beginning to end. For example, the guest may be switched from the privileged mode of operation to unprivileged mode of operation in which the guest does not have privileges to execute trusted code and returned from the page 200 to another code page. Some examples of watchdog code 202 instructions include one or more of: (1) a virtual machine function return instruction, in order to switch to an unprivileged mode of operation and return to another code page; (2) a hypercall instruction, to exit to the hypervisor; and (3) a branch or a jump instruction that branches/jumps to itself, thereby causing an infinite loop. An exit to the hypervisor may include additional determinations by the hypervisor in order to take corrective action. Corrective action may include suspending operation of the virtual machine that triggered the watchdog code, logging an error, restarting the virtual machine that triggered the watchdog code, restoring operation of the virtual machine on a non-privileged page, and other actions as may be appropriate.

In the present example, the watchdog code 202 is stored in a first portion of page 200. The first watchdog code instruction is stored at the first page offset, 0x0000, which is the first memory address of the page. The last watchdog code instruction is stored at a second page offset, 0x03FF. The watchdog code 202 occupies an address range from the first page offset to the second page offset. In some examples, the watchdog code 202 is an instruction that is repeated throughout the address range.

In the present example, trusted code 204 is stored in a second portion of page 200. The first trusted code instruction is stored at a third page offset, 0x0400, which immediately follows the last watchdog code instruction that is stored at the second page offset 0x03FF. The last trusted code instruction is stored at an offset immediately preceding the fourth page offset, 0x1000. The trusted code 204 occupies an address range from the third page offset to the fourth page offset.

Trusted code 204 is executed to perform actions that a guest normally would not have access privileges to execute. For example, trusted code 204 may allow the guest to access host devices, control the state of the host CPU, access hypervisor memory, and so forth. The trusted code 204 includes instructions that are pre-determined to be suitable for a guest to execute, and therefore are "trusted" by the hypervisor for performing the hypervisor-level functions that a guest normally would not be trusted to execute. In the present example, the trusted code 204 instructions are not instructions programmed by a guest, by rather, are instructions pre-configured by a host or hypervisor and provided to a guest along with one or more security measures such as watchdog code 202 to enforce integrity of the operating environment while executing the trusted code 204.

In the present example, a guest may access the trusted code 204 by executing an instruction 206 to begin execution of the first trusted code instruction at page offset 0x0400. In some examples, the instruction 206 is a virtual machine function call, jump, branch, or other function call instruction. The instruction 206 may be referred to as an instruction to "navigate" to the trusted code 204 from another page. The instruction 206 provides the guest with the means for locating and executing the trusted code 204 while avoiding the watchdog code 202.

It is desired that the hypervisor configure the trusted code 204 to mitigate the chances of a guest accessing the page 200 in a malicious way. For example, a malicious guest may misconfigure guest's page tables prior to using the page tables to navigate to the page 200.

The storing of the watchdog code 202 at the beginning of the page 200 provides a security measure to enforce that the guest enters the page 200 via the instruction 206, because a guest that attempts to access the page 200 by executing instructions at the beginning of the page 200 will execute watchdog code 202 rather than trusted code 204.

The watchdog code 202 also provides other security measures. In the present example, trusted code 204 occupies a part of a page, but not the entire page. Prior to initializing the page 200 with watchdog code 202 there may be other portions of the page 200 that include instructions or other data that left over from prior page assignments. For example, a hypervisor may re-use and re-assign pages between a plurality of virtual machines. Without initializing the page 200, there may be data remaining on the page from previous operations, such as data written by another virtual machine. It is therefore beneficial to initialize these other portions of the page with the watchdog code 202, such that the page does not include any additional instructions or other data other than the watchdog code 202 and the trusted code 204.

Figure 3:
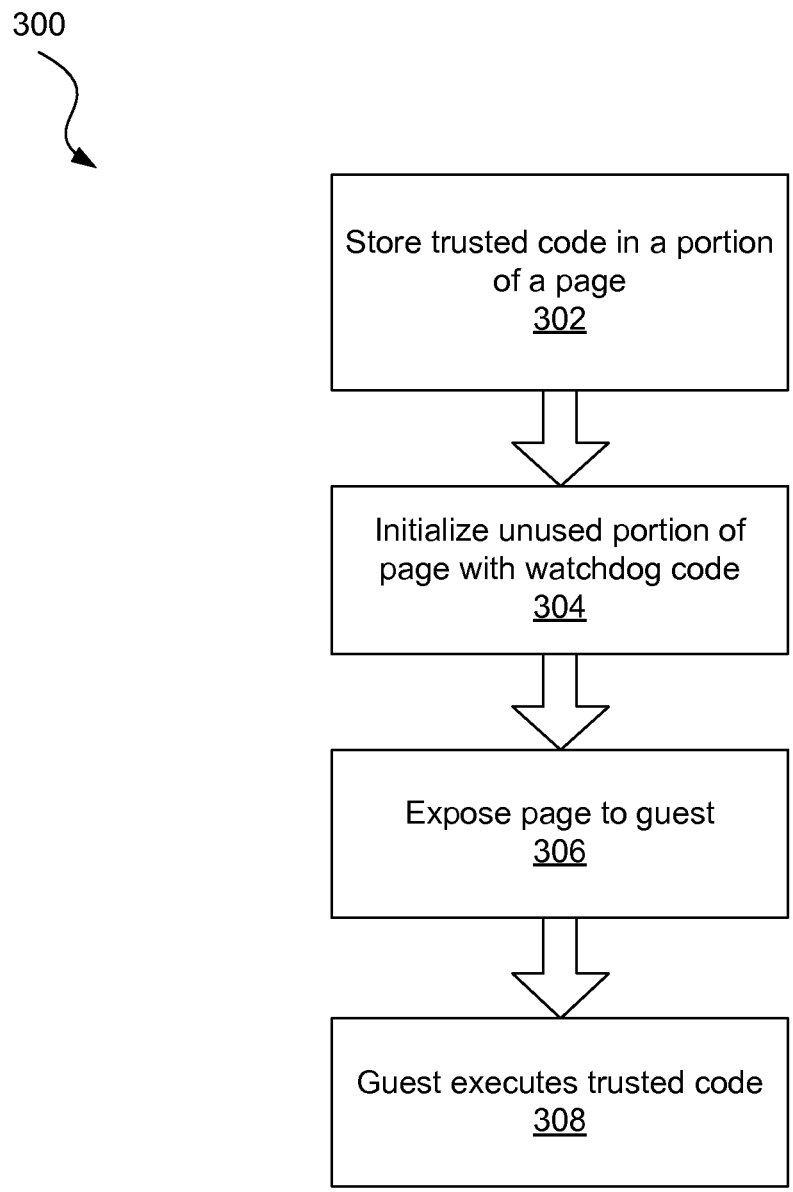
FIG. 3 is a flowchart showing an illustrative initialization of a page with watchdog code, in accordance with various examples of the present disclosure.

FIG. 3 is a flowchart showing an illustrative initialization of a page with watchdog code. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, trusted code is stored on a host page by writing the trusted code to memory addresses of the host page. In some examples the trusted code is stored on the host page by a hypervisor. In other examples, the trusted code is stored on the host page by a host. In the present example, the host page is located at a host physical address (HPA) that is accessible by the hypervisor. The hypervisor maps the HPA to a guest physical address (GPA). The guest maps the GPA to a guest virtual address (GVA). Accordingly, the page at the GVA includes the trusted code that was written to the host page. In some examples, the trusted code may be copied from the host page and written to a page at a GVA. Therefore, a page (the page identified at the GVA) that contains trusted code is prepared for access by the guest.

In the present example, the trusted code occupies some of the memory addresses of the page, but not all of the addresses. Accordingly, the trusted code may be positioned at various portions of the page. In some examples, the trusted code is positioned at the end of a page, with unused addresses positioned before the trusted code. In other examples, the trusted code is positioned in the middle of the page, with unused addresses positioned before and after the trusted code. In yet other examples, the trusted code is positioned at the beginning of the page, with unused addresses following the trusted code.

At block 304, the unused addresses that are not used to store trusted code are initialized with watchdog code. In the present example, the unused portion is the portion of the page that is prior to the trusted code portion of the page. In some examples, the host may determine an unused portion of the page by iterating through memory addresses or address ranges that are stored in a mapping table. In some examples, the initializing of the page with the watchdog code may include storing the watchdog code itself in the memory addresses of the page where the trusted code is not stored. In some examples, the initializing of the page with the watchdog code may include updating a mapping such that the addresses in the unused portion of the page point to addresses where watchdog code is stored.

At 306, the page that stores the trusted code and the watchdog code is exposed to the guest. In some examples, exposing the page may refer to identifying the page as in a useable state. In some examples, a bit or a flag is in order to notify the host processor that the page is initialized and ready for use by the guest.

At block 308, the guest executes a navigation instruction such as a virtual machine function call instruction or other function call, a jump instruction, or a branch instruction, that commences execution at the address of the first trusted code instruction. The guest continues executing in the trusted code portion of the page until reaching a navigation instruction to leave the page, such as a virtual machine function return instruction that returns to the previous page. In some examples, the return address is positioned at the last address of the trusted code portion, such that the guest executes the instruction to leave the page prior to encountering potential watchdog code that may follow the trusted code. The guest is therefore able to execute the trusted code without executing any watchdog code that may be positioned before or after the trusted code. In another example, watchdog code may be positioned between trusted code portions, with a jump or branch instruction positioned prior to a watchdog portion in order to navigate over the watchdog code to the next trusted code portion.

In some examples, a guest may attempt to improperly access the page by executing at an offset on the page where the trusted code is not stored. For example, a guest may attempt to execute instructions beginning at the start of the page. If there is watchdog code positioned at the start of the page, the guest that attempts to execute instructions at the start of the page will execute the watchdog code, rather than trusted code. Accordingly, the watchdog code mitigates the risk of a guest executing instructions on the page at a position that is different than the position identified by the virtual machine function call or other function call, jump instruction, or branch instruction referred to in block 308.

Figure 4:
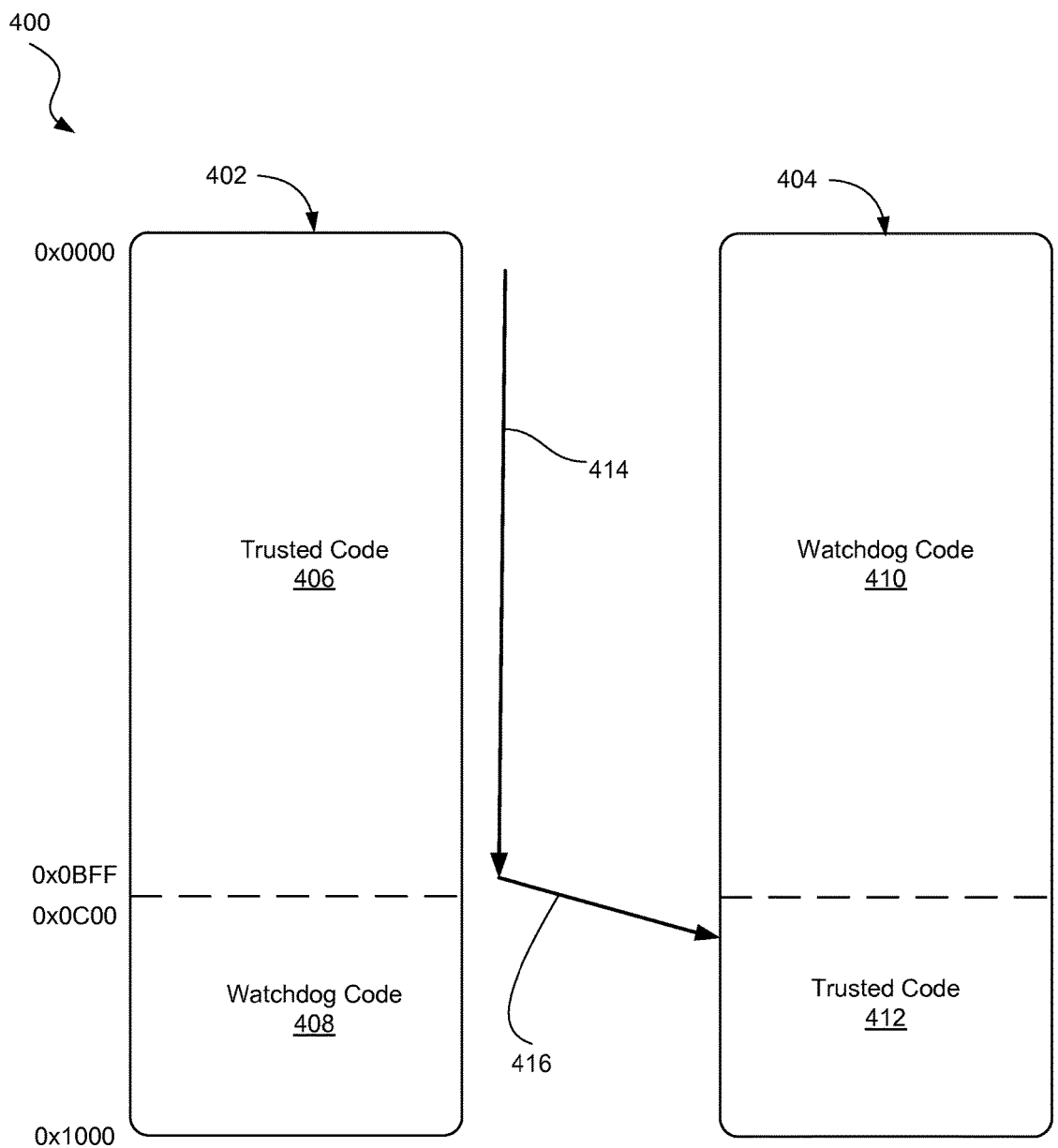
FIG. 4 is a block diagram illustrating multiple pages initialized with watchdog code, in accordance with various examples of the present disclosure.

FIG. 4 is a block diagram illustrating multiple pages initialized with watchdog code. According to the present example, trusted code is divided into a first page 402 and a second page 404. Each page is a privileged page, which a hypervisor provides the guest in order to allow the guest to execute trusted code that the guest normally would not have access privileges to execute. These privileges may be referred to as hypervisor-level access privileges, as the privileges assigned to the privileged pages allow the guest to perform activities typically performed by hypervisors, rather than guests.

The first page includes a trusted code 406 portion and a watchdog code 408 portion.

Trusted code 406 is a first portion of the trusted code. In the present example, the trusted code 406 is written from offset 0x0000 (the start of the page) to a second offset, which in this example is 0x0BFF. The trusted code 406 is stored in the address range between the first offset and the second offset.

In the present example, watchdog code 408 is initialized into the memory range immediately following the trusted code 406, from a third offset 0x0C00 to a fourth offset 0x1000 (the end of the page). Accordingly, the first page 402 is filled with the trusted code 406 and the watchdog code 406.

The second page includes a watchdog code 410 portion and a trusted code 412 portion.

In the present example, the watchdog code 410 is initialized from offset 0x0000 (the start of the page) to a second offset, which in this example is 0x0BFF. The watchdog code 410 is stored in the address range between the first offset and the second offset. In some examples, the initializing may be performed by writing or copying watchdog code to the first page.

In the present example, trusted code 412 is written to the memory range immediately following the watchdog code 410, by storing the trusted code 412 from a third offset 0x0C00 to a fourth offset 0x1000 (the end of the page). Accordingly, the second page 404 is filled with the watchdog code 410 and the trusted code 412.

In the present example, execution of the instructions begins with the first instruction of the trusted code 406, at the first offset, and commences as shown by line 414, until reaching the end of the first portion of the trusted code on page 1, at the second offset. Following the execution of the last line of the trusted code 406, execution continues with the first line of trusted code 412, at the third offset, as illustrated by line 416.

The presence of the watchdog code 408 and 410 mitigates the risk of GVA to GPA corruption. As an example, a malicious guest may attempt to change from the first page to the second page prior to reaching the last instruction of trusted code 406 at the second offset. The addresses of the second page prior to the trusted code 412 at the third offset are initialized with the watchdog code 410. Accordingly, a guest that changes the page to the second page prior to reaching the third offset will arrive at the watchdog code 410.

Figure 5:
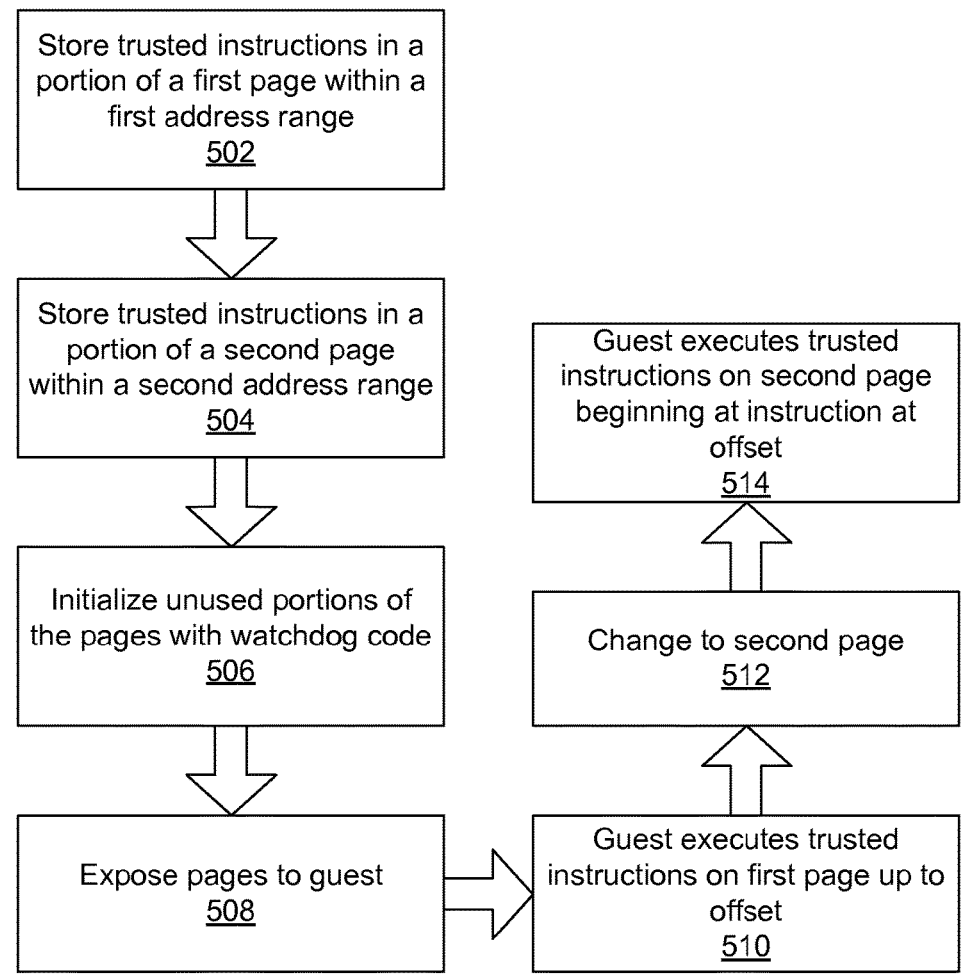
FIG. 5 is a flowchart showing an illustrative initialization of multiple pages with watchdog code, in accordance with various examples of the present disclosure.

FIG. 5 is a flowchart showing an illustrative initialization of multiple pages with watchdog code. The method 500 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 502, trusted code is written to a first page. In the present example, the trusted code is stored in some of the memory addresses of the page, but not all of the addresses. Accordingly, the trusted code may be positioned at various portions of the page. In the present example, the trusted code is written at the beginning of the first page.

At block 504, trusted code is written to a second page. In the present example, the trusted code is stored in some of the memory addresses of the page, but not all of the addresses. Accordingly, the trusted code may be positioned at various portions of the page. In the present example, the trusted code is written at the end of the second page.

At block 506, the portions of the first page and the second page that are not used to store trusted code are initialized, such as by one or more data write operations, with watchdog code. In the present example, the unused portion of the first page is identified as the addresses of the first page that are after the trusted code portion of the first page. In the present example, the unused portion of the second page is identified as the addresses of the second page that are before the trusted code portion of the second page.

In some examples, the host may determine an unused portion of a page by iterating through memory addresses or address ranges that are stored in a mapping table. In some examples, the initializing of the pages with watchdog code may include storing the watchdog code itself in the memory addresses of the pages where the trusted code is not stored. In some examples, the initializing of the pages with the watchdog code may include updating a mapping with pointers such that the addresses in the unused portion of the page are directed to addresses where watchdog code is stored.

At 508, the pages that store the trusted code and the watchdog code are exposed to the guest.

At block 510, the guest executes a navigation instruction, such as a virtual machine function call instruction or other function call instruction, a jump instruction, or a branch instruction, that commences execution at the address of the first trusted code instruction on the first page, which is located at a first offset. The guest continues executing the trusted code until reaching the last instruction of the trusted code of the first page, which is located at a second offset.

At block 512, once reaching the end of the trusted code on the first page, the guest changes the page to the second page.

At block 514, the guest executes the trusted code on the second page at the next offset, a third offset, immediately following the second offset. Execution of the trusted code on the second page continues until reaching the end of the trusted code portion of the second page, which is located at a fourth offset. In some examples, the fourth offset is located at the end of the second page.

In some examples, a guest may attempt to improperly access the second page by changing to another page, such as the second page, prior to reaching the end of the trusted code on the first page. A guest that attempts to execute instructions on the second page prior to the trusted code on the second page will execute the watchdog code. Accordingly, the watchdog code mitigates the risk of a guest executing instructions on the second page other than the trusted code instructions or the watchdog code instructions.

Figure 6:
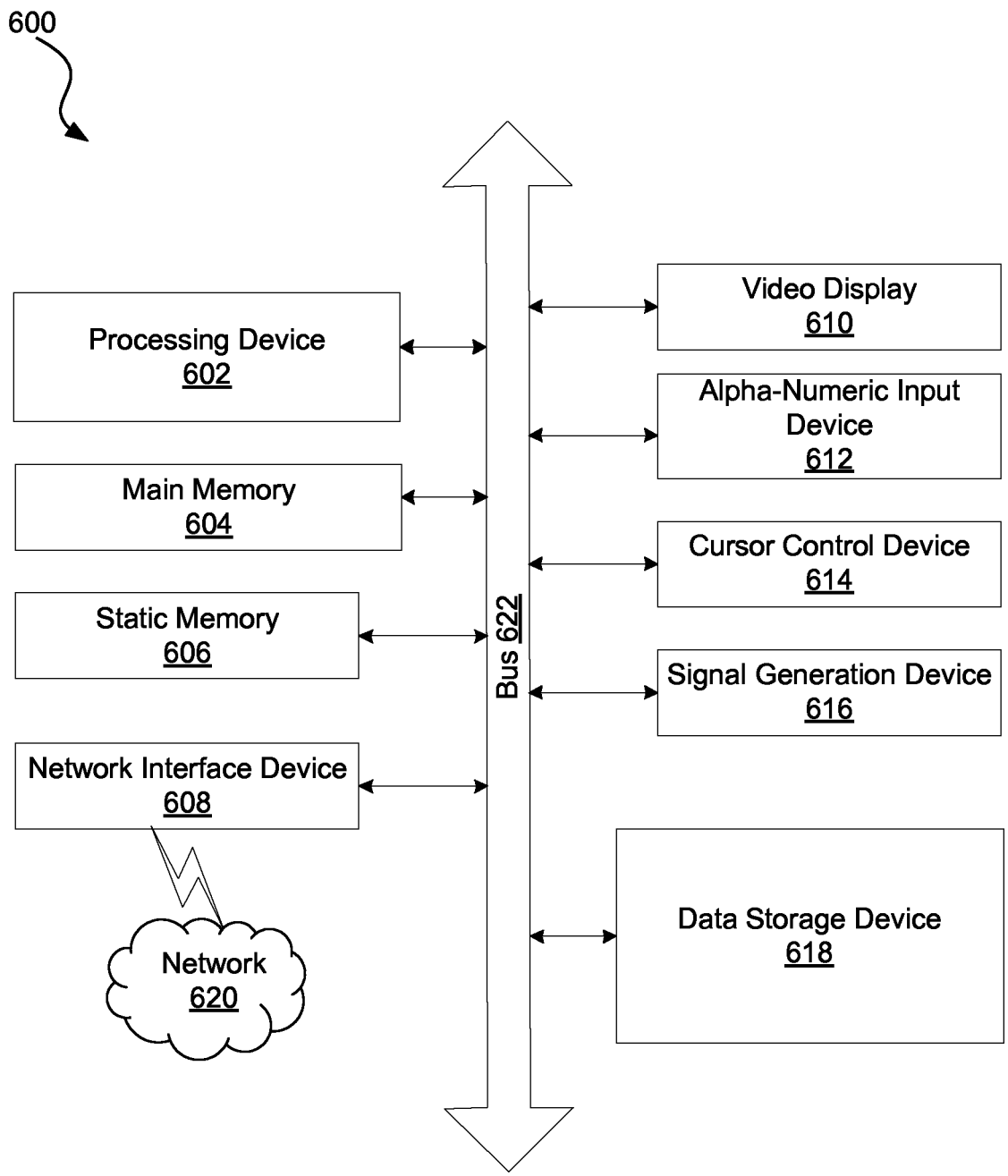
FIG. 6 is a block diagram illustrating a computer system that may perform one or more of the operations described herein, in accordance with various examples of the present disclosure.

FIG. 6 illustrates a diagram of a machine in the exemplary form of a computer system 600 within which a set of instructions, for causing the machine to perform any one or more of the methodologies discussed herein, may be executed. The machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 600 includes processing device (processor) 602, main memory 604 (e.g., read-only memory (ROM), flash memory, dynamic random access memory (DRAM) such as synchronous DRAM (SDRAM), double data rate (DDR SDRAM), or DRAM (RDRAM), and so forth), static memory 606 (e.g., flash memory, static random access memory (SRAM), and so forth), and data storage device 618, which communicate with each other via bus 622.

Processor 602 represents one or more general-purpose processing devices such as a microprocessor, central processing unit, or the like.

More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions for performing the operations and steps discussed herein.

Computer system 600 may further include network interface device 608.

Computer system 600 also may include video display unit 610 (e.g., a liquid crystal display (LCD) or a cathode ray tube (CRT)), alphanumeric input device 612 (e.g., a keyboard), cursor control device 614 (e.g., a mouse), and signal generation device 616 (e.g., a speaker).

Data storage device 618 may include a computer-readable storage medium that stores one or more sets of instructions (e.g., software) embodying any one or more of the methodologies or functions described herein. The instructions may also reside, completely or at least partially, within main memory 604 and/or within processor 602 during execution thereof by computer system 600, main memory 604 and processor 602 also constituting computer-readable storage media. The instructions may further be transmitted or received over network 620 via network interface device 608.

While data storage device 618 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for initializing privileged memory pages in a virtual environment comprising:
    writing a first set of trusted instructions to a first address range of a first memory page, the first set of trusted instructions including one or more instructions that a hypervisor provides to a guest;
    determining that there is a second address range on the first memory page that is not included in the first address range, the first address range positioned between a first offset on the first memory page and a second offset on the first memory page;
    writing a first set of watchdog instructions to the second address range, the second address range positioned between a third offset on the first memory page and a fourth offset on the first memory page, wherein the first set of watchdog instructions include one or more instructions executable to perform at least one of the following:
        modify access privileges of the guest;
        exit to the hypervisor;
        return to another memory page;
        provide an infinite loop; or
        halt execution of the guest;
    writing a second set of trusted instructions to a second memory page, the second set of trusted instructions positioned between the third offset on the second memory page and the fourth offset on the second memory page;
    writing a second set of watchdog instructions to the second memory page, the second set of watchdog instructions positioned between the first offset on the second memory page and the second offset on the second memory page; and
    executing, by the guest, the first set of trusted instructions.

2. The method of claim 1, the executing comprising:
    exposing the first memory page to the guest;
    navigating to the first offset of the first memory page;
    executing instructions in the first set of trusted instructions until reaching the second offset;
    exposing the second memory page to the guest; and
    executing instructions in the second set of trusted instructions, beginning with an instruction positioned at the third offset.

3. The method of claim 1, wherein the access privileges of the guest are modified for the guest to execute the first set of trusted instructions.

4. The method of claim 1, wherein the second offset is greater than the first offset, the third offset is greater than the second offset, and the fourth offset is greater than the third offset.

5. The method of claim 1, wherein the first address range of the first memory page and the second address range of the first memory page include all addresses on the first memory page.

6. The method of claim 1, wherein the first set of watchdog instructions and the second set of watchdog instructions comprise an instruction that is repeated a plurality of times.

7. The method of claim 1, wherein the guest is provided with hypervisor-level access privileges while executing instructions on the first memory page and the second memory page.

8. The method of claim 1, wherein the one or more instructions are executable to modify access privileges of the guest.

9. The method of claim 1, wherein the one or more instructions are executable to return to another memory page.

10. A non-transitory computer-readable medium comprising computer-readable instructions which, when executed by at least one processor, cause the at least one processor to perform operations comprising:
    writing trusted code in a first address range on a memory page, the trusted code including one or more instructions that a hypervisor provides to a guest;
    determining that there is a second address range on the memory page that is unused by the trusted code, wherein the second address range is located prior to the first address range and adjacent to the first address range;
    initializing the second address range on the memory page with watchdog code, wherein the watchdog code includes one or more instructions executable to perform at least one of the following:
        modify access privileges of the guest;
        exit to the hypervisor;
        return to another memory page;
        provide an infinite loop; or
        halt execution of the guest;
    writing additional trusted code to a second memory page, the additional trusted code positioned in the second address range of the second memory page;
    writing the watchdog code to the second memory page, the watchdog code positioned in the first address range of the second memory page; and executing, by the guest, the trusted code on the memory page and the additional trusted code on the second memory page.

11. The non-transitory computer-readable medium of claim 10, wherein the first address range and the second address range include all addresses on the memory page.

12. The non-transitory computer-readable medium of claim 10, wherein the watchdog code comprises an instruction that is repeated a plurality of times.

13. The non-transitory computer-readable medium of claim 10, wherein access privileges of the guest are increased to hypervisor-level access privileges while executing trusted instructions on the memory page.

14. The non-transitory computer-readable medium of claim 10, further comprising:
  determining that there is a third address range that is unused by the trusted code, the third address range located both: (i) after the first address range and (ii) adjacent to the first address range; and
  initializing the third address range with the watchdog code.

15. The non-transitory computer-readable medium of claim 10, the executing of the trusted code further comprising:
  navigating to the first address range on the memory page;
  executing instructions in the first address range;
  navigating to the second address range of the second memory page; and
  executing instructions in the second address range of the second memory page.

16. A system comprising:
  one or more processors communicatively coupled with at least one memory, the memory including a first memory page and a second memory page, wherein the one or more processors execute instructions on the first memory page and the second memory page;
  a first set of instructions stored before an offset on the first memory page, the first set of instructions including one or more instructions that a hypervisor provides to a guest for the guest to execute with modified access privileges;
  a second set of instructions stored at the offset on the first memory page, the second set of instructions initialized with a watchdog code, wherein the watchdog code includes one or more instructions executable to perform at least one action from a group of actions comprising:
    removing the modified access privileges of the guest;
    exiting to the hypervisor;
    returning to another memory page;
    providing an infinite loop; or
    halting execution of the guest;
  a third set of instructions stored before the offset on the second memory page, the third set of instructions initialized with the watchdog code;
  a fourth set of instructions stored at the offset on the second memory page, the fourth set of instructions including one or more instructions that the hypervisor provides to the guest for the guest to execute with the modified access privileges; and
  a page table identifying the second memory page as following after the first memory page in order of execution.

17. The system of claim 16, wherein the second set of instructions is stored on the first memory page based on a determination that the first memory page includes addresses that are not used by the first set of instructions.

18. The system of claim 16, wherein the third set of instructions is stored on the second memory page based on a determination that the second memory page includes addresses that are not used by the fourth set of instructions.

19. The system of claim 16, the one or more processors to perform operations comprising:
  exposing the first memory page to the guest;
  navigating to the first set of instructions on the first memory page;
  executing instructions in the first set of instructions until reaching the offset;
  exposing the second memory page to the guest; and
  executing instructions in the fourth set of instructions, the execution of the fourth set of instructions beginning with an instruction positioned at the offset on the second memory page.

20. The system of claim 16, wherein the guest is provided with hypervisor-level access privileges while executing instructions on the first memory page and the second memory page.

* * * * *